Patented Apr. 8, 1952

2,592,147

UNITED STATES PATENT OFFICE 2,592,147

CODISPERSIONS OF POLYTETRAFLUORO- ETHYLENE AND HYDROUS OXIDES

Carol K. Ikeda, Philadelphia, Pa., assignor to E. I. du Pont de Nemours & Company, Wilmington, Del., a corporation of Delaware No Drawing. Application May 23, 1947, Serial No. 750,166

3 Claims. (Cl. 260—29.6)

This invention relates to aqueous colloidal dispersions of polytetrafluoroethylene in a modified form and more particularly to the preparation of colloidal codispersions of polytetrafluoroethylene and hydrous oxide sols.

The particular stability of polytetrafluoroethylene to chemical attack, heat, solvents, light and electrical stresses makes it highly desirable as a coating material. However, the application of this polymer in thin continuous adherent coats, for example, to wire or other metallic substrates and the like have heretofore been impractical. The insolubility of the polymer precludes the use of solution techniques for the achievement of these ends. In that polytetrafluoroethylene in the molten state has exceptionally high melt viscosity and tends to undergo physical disintegration when subjected to stress, melt extrusion techniques for achieving these results have also been impractical.

Polytetrafluoroethylene is difficult to modify with added materials because of its insolubility, infusibility, and incompatibility with practically all substances. Gross mixtures of polytetrafluoroethylene with inorganic oxides such as titanium dioxide and silicon dioxide have been disclosed in United States Patents 2,392,388; 2,400,099; and 2,400,091 where the modifier is added in a powdered form. United States Patent 2,393,967 discloses the preparation of a finely divided polymer of tetrafluoroethylene by a dispersion method which includes the addition to the polymerization mixture of finely divided solids which serve as fillers for the polymer. Coatings prepared from these previously described mixtures of polytetrafluoroethylene and inorganic oxides exhibit microscopic discontinuities, tend to be rough and have poor adhesion to surfaces such as copper wire.

The object of this invention is the production of an improved and modified form of polytetrafluoroethylene exemplifying improved properties, especially when used to form a protective coating on solid substrates, such as metal and glass. A further object of this invention is the production of modified aqueous dispersions of polytetrafluoroethylene which exhibit remarkably improved adhesive properties as compared with coatings applied from unmodified polytetrafluoroethylene dispersions. A still further object of this invention is the production of aqueous codispersions of polytetrafluoroethylene and hydrous oxide sols.

These and other objects are attained in accordance with the present invention wherein an aqueous colloidal dispersion of polytetrafluoroethylene is modified by the admixture of a stabilized aqueous dispersion of a colloidal hydrous oxide sol, the said aqueous dispersion of polytetrafluoroethylene having therein a surface active agent functioning as a protective colloid. It has been found that the hydrous oxide dispersion must contain from 5% to 50% of the oxide in the sol based on the weight of the polytetrafluoroethylene.

It has been found that a polytetrafluoroethylene dispersion of improved properties, particularly when used to form a protective coating, can be prepared from an aqueous dispersion of colloidal polytetrafluoroethylene in intimate association with a colloidal hydrous oxide sol, the amount of hydrous oxide being from 5% to 50% by weight based on the polytetrafluoroethylene. The colloidal particles of the polytetrafluoroethylene and the hydrous oxide must not be over approximately 0.2 micron in their smallest dimension and not over about 1 micron in their largest dimension.

The hydrous oxides which are operative in this invention are hydrated oxides of the elements of Groups III and IV of the Periodic Table which form colloidal hydrates which are capable of dehydration at relatively low temperatures, i. e., under 300° C. to refractory solid oxides. The hydrous oxides are insoluble in water and have water of hydration associated with them, and are essentially neutral to litmus. Examples of these are hydrated aluminum oxide, hydrated silicon dioxide, hydrated titanium dioxide, and hydrated zirconium oxide.

In particular, colloidal, silica sols, stabilized with from 0.1 to 1.0% by weight based on silica of the hydroxides of the alkali metal elements prior to admixture with colloidal polytetrafluoroethylene, have been found to have particular advantages. When the intimate colloidal mixture of the polymer and the silica thus formed is applied to copper wire, a coating is obtained which has greatly improved adhesion to the copper as compared with a coating from a dispersion containing polytetrafluoroethylene in an unmodified form. This is unexpected, in view of the known chemical inertness of both polytetrafluoroethylene and hydrous oxides such as silicon dioxide. No interaction or coaction on the part of these components would have been anticipated. That there is some coaction is attested by the striking improvement in the adhesion of the coatings applied from these modified dispersions.

The following examples in which parts are by weight and the dispersions are all aqueous dispersions illustrate specific embodiments of this invention but do not limit it.

*Example I*

Five parts of a silica sol containing 27% silicon dioxide and sodium hydroxide corresponding to 0.4% by weight of sodium oxide based on the silicon dioxide, which functions to stabilize the sol, is added to 20.7 parts of a 67% solids colloidal dispersions of polytetrafluoroethylene containing 3%, based on the polymer, of a commercial surface-active agent comprising a long-chain alkyl sodium sulfate derived from coconut oil alcohols.

Copper wire (#28 standard gauge) is passed through the colloidal mixture at the rate of 5 ft. per minute and baked approximately 20 seconds at 375° C. After four passes there is formed on the wire a smooth, glossy, transparent, flexible and extensible coating of 0.0009 inch thickness. This coating is remarkably adherent to the copper and cannot be removed by vigorous scraping of the adjacent sections of the wire against each other. A similar coating on copper wire applied from the same polytetrafluoroethylene dispersion from which the silica is absent can be readily scraped off in this manner.

*Example II*

To fifty parts of an acidic polytetrafluoroethylene colloidal dispersion containing 58% polymer and containing 6%, based on the polymer, of the dispersing agent of Example I was added with stirring 4.7 parts of a dispersion of colloidal silicon dioxide containing 32.8% solids. A polytetrafluoroethylene/silica dispersion was formed which contained about 53% polytetrafluoroethylene and about 5% silica based on polytetrafluoroethylene. The dispersion had a pH of about 3.

A coating of this dispersion was applied to #25 (standard gauge) soft copper wire by passing the wire at a speed of 10.7 ft. per minute through the dispersion and then baking the coating by passing the wire at the same speed through a three ft. oven heated to about 400° C. After four coats had been applied in this manner, the coating on the wire was about 0.0014 inch in thickness. The adhesion of the coating to the wire was excellent as determined by the following tests.

When a piece coated with the polytetrafluoroethylene/silica composition as described above was subjected to breaking by a quick sharp jerk, the coating did not pull away from the metal to cause sleeving during the stretching and breaking of the wire.

When the coating was scraped with the thumbnail, the film did not pull away from the metal.

The coated wire showed a high scrape-abrasion test value of 90. This test was performed by a device which repeatedly scraped the surface of the coated wire with a #11 steel needle (0.016 inch in diameter) at right angles to the length of the wire. A 200 gram weight was used to force the needle against the wire. The scrape-abrasion test value is the number of cycles the needle makes before wearing through to the metal. A high scrape-abrasion value indicates good adherence of the coating to the metal.

A copper wire having a coating of unmodified polytetrafluoroethylene of 0.0015 inch thickness prepared in the same manner as indicated above by using a dispersion of polytetrafluoroethylene and containing about the same amount of polytetrafluoroethylene and 6% of the same dispersing agent (based on polytetrafluoroethylene) showed very poor adherence of the coating to the metal, as indicated by applying the same tests as for the silica modified polytetrafluoroethylene coated wire with the following results:

(a) When the wire was broken by a quick sharp jerk, the coating pulled away from the metal and sleeved badly.

(b) The coating is easily scraped off the wire with the thumbnail.

(c) The coated wire shows a scrape-abrasion value of 3.

*Example III*

To 35.3 parts of a 49.8% solids colloidal dispersion of polytetrafluoroethylene containing 3%, based upon the polymer, of the surface-active agent of Example I, is added 9.7 parts of a silica sol containing 18% silicon dioxide. There is obtained a highly fluid colloidal dispersion containing 43% solids of which 90% by weight is polytetrafluoroethylene and 10% by weight is silicon dioxide. Films are cast from this dispersion by flowing it on glass surfaces and heating the resulting coatings directly with a flame to above 327° C. until they become transparent. The films are tough and flexible and can be cold drawn. They adhere strongly to the glass and are not readily lifted therefrom by soaking in an aqueous solution of ammonia. The films containing the silica are harder than a film prepared in a similar manner from an unmodified dispersion of polytetrafluoroethylene.

*Example IV*

To one hundred parts of a colloidal dispersion of polytetrafluoroethylene containing 3.7% polymer there is added 20 parts of a 1% solution of dodecylamine acetate and 10 parts of a 4% alumina sol. A saturated solution of ammonium bicarbonate is added in small increments, with stirring, to this mixture until precipitation of the voluminous floc is complete and the supernatant liquid is clear. The floc is isolated by filtration with the aid of vacuum. Acetic acid is added with stirring to the wet floc until the pH is 5.6. This mixture is allowed to stand, with occasional stirring, for several minutes or until the solid material peptizes to the colloidal state. There is obtained an approximately 20% solids colloidal dispersion of polytetrafluoroethylene and alumina. This dispersion is concentrated by evaporation at 60° C. to 52% solids.

Copper wire (#28 standard gauge) is passed at a rate of 5 ft. per minute through this dispersion, followed by baking for approximately 20 seconds at 375° C. After four passes there is obtained a coating 0.001 inch thick on the wire which is smooth, glossy, and slightly milky in appearance.

The polytetrafluoroethylene dispersions used in this invention can be prepared by the process of application Serial Number 695,059, filed September 5, 1946, now U. S. Patent 2,478,229. The presence of a surface active agent which functions as a protective colloid, as disclosed in the above application, is essential to the stability of the codispersions of polytetrafluoroethylene and hydrous oxides as exemplified by this invention.

The hydrous oxide sols useful in this invention can be prepared by the method of U. S. 2,244,325 or by the hydrolysis of salts, for example, the hydrolysis of titanium sulfate to form titania.

The surface-active agents which are used in preparing the dispersions of the polytetrafluoroethylene and the hydrous oxide sols are water-soluble and must be of a type which do not cause coagulation of the hydrous oxide sol. For use with the silica, the anion-active types, such as the alkali metal or ammonium salts of long-chain carboxylic or sulfonic acids or sulfate esters are preferred, whereas with alumina the cation-active types such as salts of long-chain amines and of quaternary ammonium bases containing a long-chain alkyl group are preferred. Other surface-active agents which may be used include the non-ionic types such as polyalcohols, polyglycol ethers and vegetable gums.

To achieve the advantageous results, such as improved adhesion to copper wire, the dispersion must contain from 5% to 50% by weight of the oxide in the sol based on the weight of the polytetrafluoroethylene.

The respective dispersions from which these compositions are made must be colloidal, that is, the smallest dimension must be less than 0.2 micron and they must not be over about 1 micron in their largest dimension in order to achieve the advantageous properties of the codispersion. Of the hydrous oxide-polytetrafluoroethylene dispersions, those prepared with the silica sols are preferred in view of the increased adhesion and abrasion resistance that the silica produces in combination with the polytetrafluoroethylene dispersion when coated and baked on copper wire.

The dispersions of this invention are particularly useful in preparing insulating and abrasion-resistant wire coatings. They can also be used for making adherent coatings on glass, metal, and other surfaces where abrasion resistance and chemical resistance is desired.

An aqueous sol containing silicic acid may be used in the present invention and may be prepared according to any of the processes known to the art for the preparation of such sols. In a typical process a sodium silicate solution is added with effective mixing to a solution of an acid, the amounts of silicate and acid being so selected as to produce a silicic acid sol. By effective mixing is meant that the reactants are brought together under conditions such that no substantial local concentration of excess of one or the other is present at the point of mixing or thereafter. The sol preferably should have a pH from 0.25 to 2.5.

Another method which may be used is the hydrolysis of a silicic acid ester such as methyl silicate. This method has been described by Grimaux, Compt, rend. 98, 105 (1884). Thus, a sol may be prepared by stirring methyl silicate with a sufficient quantity of water so that there are, say, five parts of $SiO_2$ per 100 parts of the mixture. The addition of sufficient acid to lower the pH to about 1 or 2 accelerates the rate of hydrolysis of the methyl silicate and increases the stability of the silicic acid in a low molecular weight state.

Another method for producing a silicic acid sol is by the electro-osmosis of sodium silicate solution as described in Schwerin U. S. Patent 1,132,394. A dilute solution of sodium silicate is subjected to electro-osmosis, the silicic acid being obtained as a solution in the anode compartment.

Still another method is by the electrolysis of sodium silicate with a mercury cathode as described in Collins U. S. Patent 1,562,940. By electrolyzing a solution of sodium silicate in a cell fitted with a lead anode and mercury cathode there is obtained a solution of silicic acid. By adding a small quantity of salt, such as sodium chloride, to the solution just before hydrolysis, the stability of the silicic acid may be increased by virtue of the small amount of hydrochloric acid thereby formed at the anode.

As many apparently widely different embodiments of this invention may be made without departing from the spirit and scope thereof, it is to be understood that I do not limit myself to the specific embodiments thereof except as defined in the appended claims.

I claim:

1. An aqueous colloidal dispersion of polytetrafluoroethylene and hydrated silica, said hydrated silica being present in a proportion of 5%–50% by weight based on the polytetrafluoroethylene and said polytetrafluoroethylene and hydrated silica being present as colloidal particles not substantially over 0.2 micron in smallest dimension and 1 micron in largest dimension.

2. An aqueous colloidal dispersion as set forth in claim 1, said dispersion containing a surface-active agent as a stabilizer therefor.

3. An aqueous colloidal dispersion as set forth in claim 2, said hydrated silica being present in said dispersion in a proportion of about 5% by weight based on the polytetrafluoroethylene.

CAROL K. IKEDA.

REFERENCES CITED

The following references are of record in the file of this patent:

UNITED STATES PATENTS

| Number | Name | Date |
| --- | --- | --- |
| 2,290,794 | Alvarado et al. | July 21, 1942 |
| 2,386,674 | Flint et al. | Oct. 9, 1945 |
| 2,393,967 | Brubaker | Feb. 5, 1946 |
| 2,478,229 | Berry | Aug. 9, 1949 |